(12) United States Patent
Hiruta et al.

(10) Patent No.: US 11,792,484 B2
(45) Date of Patent: Oct. 17, 2023

(54) INFORMATION PROVIDING SYSTEM, INFORMATION PROVIDING METHOD AND MANAGEMENT APPARATUS FOR INFORMATION PROVIDING SYSTEM FOR PROVIDING INFORMATION OBTAINED THROUGH A ROBOT

(71) Applicant: Honda Motor Co., Ltd., Tokyo (JP)

(72) Inventors: Shigenori Hiruta, Wako (JP); Daisuke Muramatsu, Tokyo (JP); Shiro Kitamura, Wako (JP); Shuji Nakayama, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 389 days.

(21) Appl. No.: 16/650,799

(22) PCT Filed: Sep. 14, 2018

(86) PCT No.: PCT/JP2018/034163
§ 371 (c)(1),
(2) Date: Mar. 25, 2020

(87) PCT Pub. No.: WO2019/065305
PCT Pub. Date: Apr. 4, 2019

(65) Prior Publication Data
US 2020/0234046 A1   Jul. 23, 2020

(30) Foreign Application Priority Data
Sep. 29, 2017  (JP) .................................. 2017-189799

(51) Int. Cl.
*G06F 16/587* (2019.01)
*H04N 21/472* (2011.01)
(Continued)

(52) U.S. Cl.
CPC ..... *H04N 21/47217* (2013.01); *G06F 16/587* (2019.01); *G06F 16/909* (2019.01); *G06F 16/9035* (2019.01); *G06V 20/20* (2022.01)

(58) Field of Classification Search
CPC ........ G06F 16/587; G06F 16/50; A63H 11/00
See application file for complete search history.

(56) References Cited

U.S. PATENT DOCUMENTS 11,281,907 B2 * 3/2022 Wexler .................. G06V 10/10
2007/0199108 A1 * 8/2007 Angle .................... G16H 70/40
901/17

(Continued)

FOREIGN PATENT DOCUMENTS

JP   2017104532 A   6/2017

*Primary Examiner* — Sanchita Roy
(74) *Attorney, Agent, or Firm* — Duft & Bornsen, PC

(57) ABSTRACT

An information providing system includes: a memory unit configured to store an image data acquired by an imaging unit a robot in association with a position data and a time data acquired by an information acquisition portion; a data extraction portion configured to extract an image data corresponding to a time and a position instructed by the user from among the stored image data; and a display unit configured to display an image based on the extracted image data. The memory unit stores the image data acquired by the imaging unit of a first robot moving with a first user and the image data acquired by the imaging unit of a second robot moving with a second user. The data extraction portion extracts an image data corresponding to a time and a position instructed by the first user from among the image data acquired by the second robot stored in the memory unit when the image data corresponding to the time and the position instructed by the first user is not present among the image data acquired by the first robot stored in the memory unit.

8 Claims, 6 Drawing Sheets

(51) Int. Cl.
*G06F 16/909* (2019.01)
*G06F 16/9035* (2019.01)
*G06V 20/20* (2022.01)

(56) References Cited

U.S. PATENT DOCUMENTS

| | | | | |
|---|---|---|---|---|
| 2011/0004341 A1* | 1/2011 | Sarvadevabhatla | .... | B25J 9/1602 |
| | | | | 700/250 |
| 2011/0252057 A1* | 10/2011 | Huang | .................. | G06Q 40/00 |
| | | | | 707/E17.014 |
| 2018/0181670 A1* | 6/2018 | Goel | .................... | G06F 16/951 |

* cited by examiner

INFORMATION PROVIDING SYSTEM, INFORMATION PROVIDING METHOD AND MANAGEMENT APPARATUS FOR INFORMATION PROVIDING SYSTEM FOR PROVIDING INFORMATION OBTAINED THROUGH A ROBOT

CROSS-REFERENCE TO RELATED APPLICATION

This application is a National Stage of PCT international application Ser. No. PCT/JP2018/034163 filed on Sep. 14, 2018 which designates the United States, incorporated herein by reference, and which is based upon and claims the benefit of priority from Japanese Patent Application No. 2017-189799, filed on Sep. 29, 2017, the entire contents of which are incorporated herein by reference.

TECHNICAL FIELD

This invention relates to an information providing system, an information providing method and a management apparatus for the information providing system for providing information obtained through a robot.

BACKGROUND ART

As systems of this type are known ones adapted to acquire viewed image data and conversation data of a traveler through a robot carried by the traveler and to store the acquired data in a server (see Patent Document 1, for example). As the system stores data regarding images and conversations at spots visited while traveling, the user (traveler) can play back the data later.

CITATION LIST

Patent Literature

Patent Literature 1: Japanese Unexamined Patent Publication No. 2017-104532

DISCLOSURE OF INVENTION

Problems to be Solved by the Invention

With the system taught by Patent Document 1, however, the system cannot provide the user reproducible data should the robot become incapable of acquiring visual and conversational data for some reason.

Means for Solving Problem

An aspect of the present invention is an information providing system including: a robot having an imaging unit acquiring an image data and configured to move with a user: an information acquisition portion configured to acquire a position data together with a time data of the user or the robot: a memory unit configured to store the image data acquired by the imaging unit in association with the position data and the time data acquired by the information acquisition portion; a data extraction portion configured to extract an image data corresponding to a time and a position instructed by the user from among the image data stored in the memory unit; and a display unit configured to display an image based on the image data extracted by the data extraction portion. The robot includes a first robot moving with a first user and a second robot moving with a second user, the memory unit stores the image data acquired by the imaging unit of the first robot and the image data acquired by the imaging unit of the second robot, and the data extraction portion extracts an image data corresponding to a time and a position instructed by the first user from among the image data acquired by the imaging unit of the second robot stored in the memory unit when the image data corresponding to the time and the position instructed by the first user is not present among the image data acquired by the imaging unit of the first robot stored in the memory unit.

Another aspect of the present invention is an information providing method for providing an information through a robot having an imaging unit acquiring an image data and configured to move with a user, the information providing method including: acquiring a position data together with a time data of the user or the robot; associating the image data acquired by the imaging unit with the acquired position data and time data to store the image data in a memory unit; extracting an image data corresponding to a time and a position instructed by the user from among the image data stored in the memory unit; and displaying an image based on the extracted image data. The robot includes a first robot moving with a first user and a second robot moving with a second user, the storing the image data includes storing the image data acquired by the imaging unit of the first robot and the image data acquired by the imaging unit of the second robot, and the extracting the image data includes extracting an image data corresponding to a time and a position instructed by the first user from among the image data acquired by the imaging unit of the second robot stored in the memory unit when the image data corresponding to the time and the position instructed by the first user is not present among the image data acquired by the imaging unit of the first robot stored in the memory unit.

Further aspect of the present invention is a management apparatus for an information providing system including: an information acquisition portion configured to acquire an image data acquired by a robot moving with a user and a position data together with a time data; a memory unit configured to store the image data acquired by the information acquisition portion in association with the position data and the time data; an input unit configured to be input an instruction by the user; a data extraction portion configured to extract an image data corresponding to a time and a position instructed by the input unit from among the image data stored in the memory unit; and a display unit configured to display an image based on the image data extracted by the data extraction portion. The robot includes a first robot moving with a first user and a second robot moving with a second user, the memory unit stores the image data acquired by the first robot and the image data acquired by the second robot, and the data extraction portion extracts an image data corresponding to a time and a position instructed by the first user from among the image data acquired by the second robot stored in the memory unit when the image data corresponding to the time and the position instructed by the first user is not present among the image data acquired by the first robot stored in the memory unit.

Effect of the Invention

According to the present invention, ample reproducible image data can be supplied to the user by means of a robot even in a case where the robot cannot acquire image data for some reason.

DESCRIPTION OF EMBODIMENT

Now, a first embodiment of the present invention will be described with reference to FIGS. 1 to 6. The information providing system according to the present embodiment of the invention is adapted to store data acquired by a robot acting together with a user in a management server and make the data stored in the management server available for supply to the user.

Figure 1:
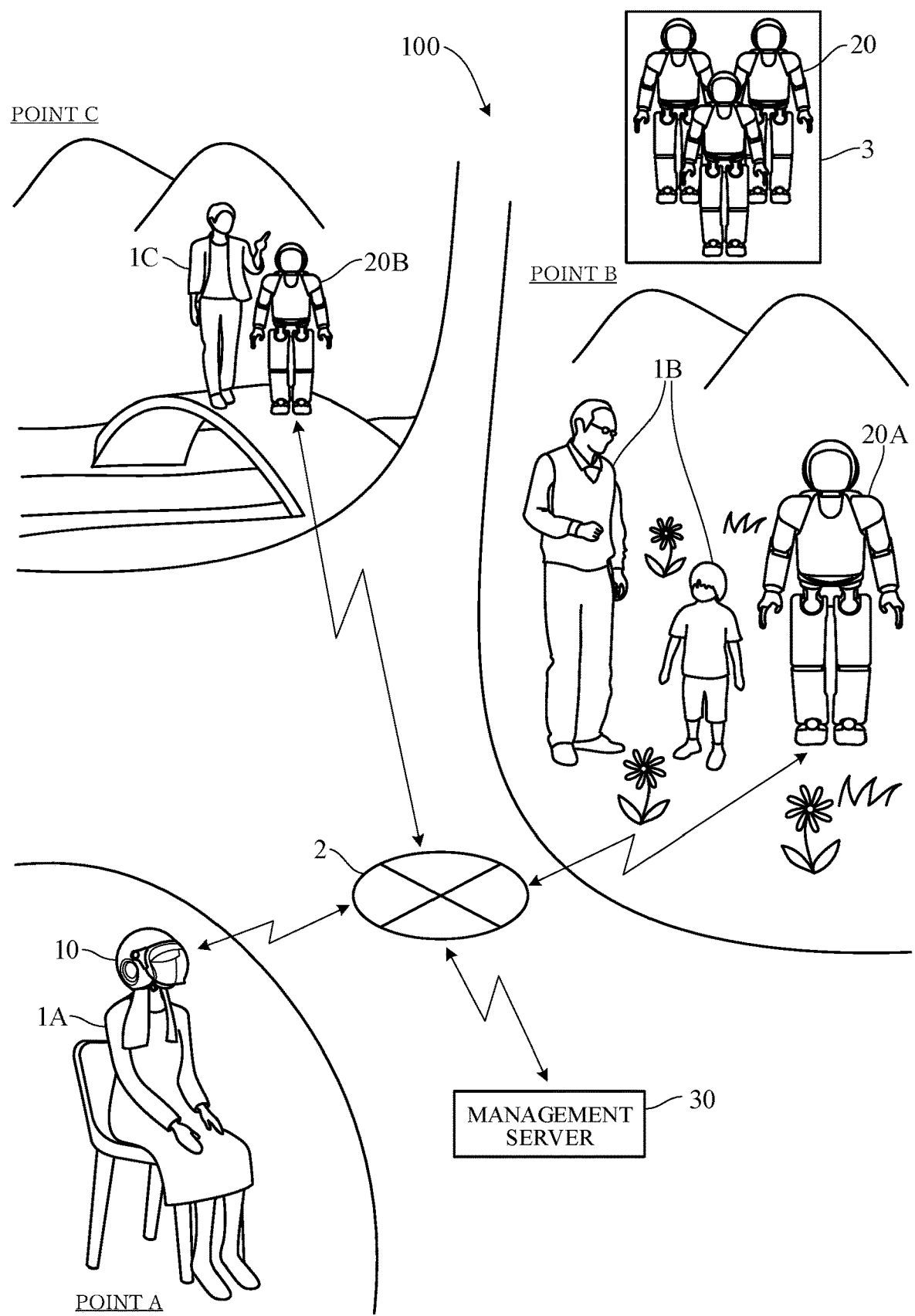
FIG. 1 is a diagram schematically showing overall configuration of an information providing system according to an embodiment of the present invention.

FIG. 1 is a diagram schematically showing overall configuration of an information providing system 100 according to an embodiment of the present invention. As shown in FIG. 1, the information providing system 100 is configured to comprise a user apparatus 10 worn by a user 1A at point A, a first robot 20A acting together with the user 1B at point B, a second robot 20A acting together with the user 1C at point C and a management server 30.

The user apparatus 10, first robot 20A, second robot 20B and management server 30 are communicably interconnected by a network 2 including internet lines or other wireless communication network connection. Robots 20A and 20B are identically configured, and both are sometimes indicated by reference symbol 20.

Point B is a remote point as viewed from point A. In other words, point A and point B are distant from each other and may, for example, be in different regions or different countries. The first robot 20A at point B is remotely operated by user 1A at point A. User 1A and user(s) 1B are, for example, family relatives, and when it is difficult for user 1A to go out with users 1B (on a trip, for example), the first robot 20A travels with user 1B in place of user 1A, and the information providing system 100 is adapted to supply information acquired by the first robot 20A in the course of the trip to the user 1A. As a result, user 1A can get a feeling just as if acting together with user 1B while actually staying at home, for example. Moreover, the second robot 20B acting together with user 1C at point C is similarly remotely controlled by another user (for example by an unshown family relative of user 1C).

Point B and point C are located in the same region—in the same sightseeing area, for example—and are therefore within a limited distance of each other. This limited distance can be several to several tens of meters or can be on the order of a few kilometers.

The first robot 20A is one rented from a shop 3 at or near point B. Namely, the first robot 20A is a robot rented by user 1B upon visiting the shop 3 and it joins user 1B in activities at point B. The second robot 20B is one rented from a shop at or near point C (from the shop 3 at point B, for example). Namely, the second robot 20B is a robot that was rented by user 1C and it joins user 1C in activities at point C. When the robots 20A and 20B complete their sightseeing at their respective locations, the users 1B and 1C return them to the shop 3.

Each robot of the shop 3 is assigned its own unique ID (robot ID) in advance. Each user renting a robot 20 is assigned a user ID for identifying individual users. The robot IDs are associated with user IDs, and robot 20 rental data, namely, data indicating which robot 20 is rented to which user for what period, are stored in the management server 30.

Figure 2:
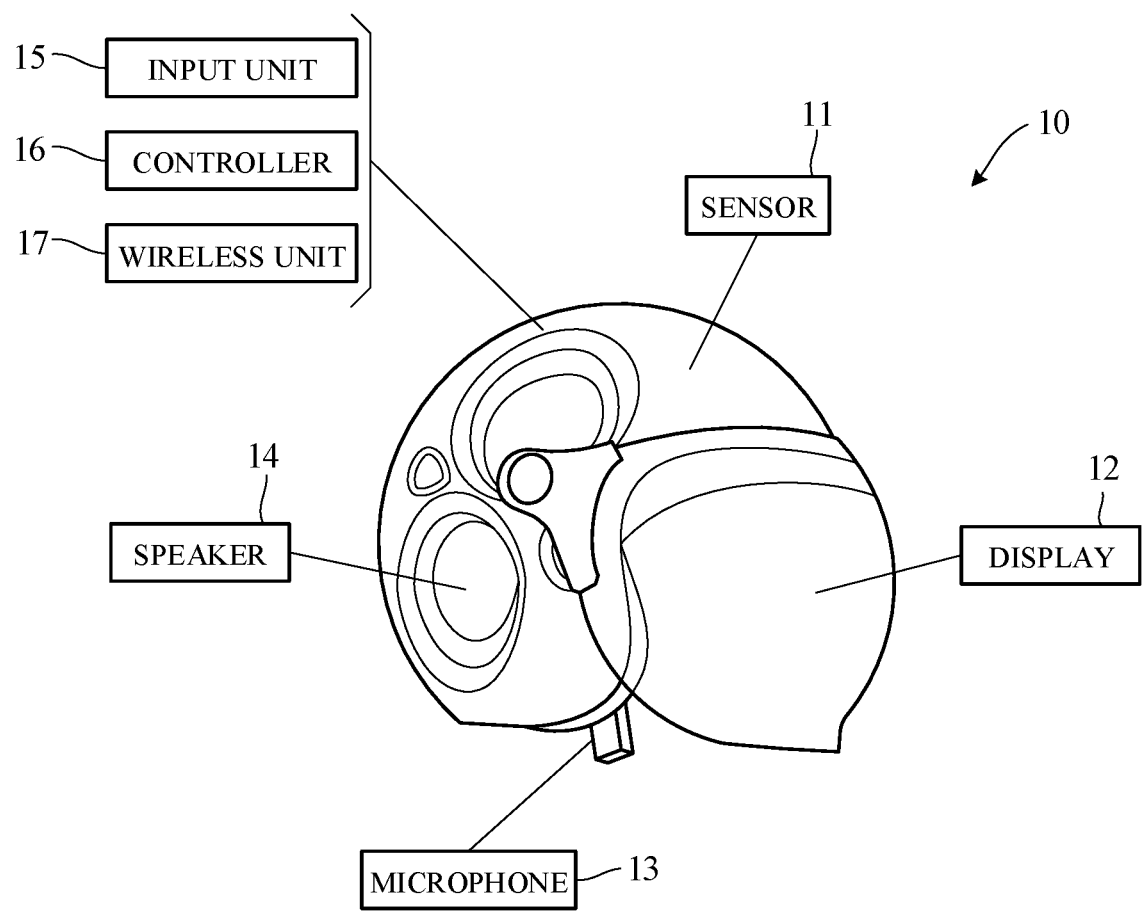
FIG. 2 is a diagram showing a configuration of the user apparatus of FIG. 1.

FIG. 2 is a diagram showing a configuration of the user apparatus 10. As shown in FIG. 2, the user apparatus 10 is a wearable computer shaped overall like a helmet, for example, and is worn on the user's head. The user apparatus 10 is provided with multiple sensors 11 for detecting brain activity such as user brain waves or magnetoencephalographic waves, and brain blood flow state. Namely, the user apparatus 10 is equipped with a so-called brain-machine interface (BMI) that detects user thoughts and intentions from brain activity signals and achieves mechanical operations without using body motions.

In addition, the user apparatus 10 has a display 12, microphone 13, speakers 14, input unit 15, controller 16 and wireless unit 17. The display 12 is, for example, a nontransparent head-mounted display positioned to surround both of the user's eyes and displays camera images taken by the robot 20. Displayed camera images include real-time camera images acquired by the robot 20 at current time and previous-time camera images acquired by the robot 20 in the past.

The microphone 13 is disposed at the user's mouth and receives voice signals produced by user utterances. The speakers 14 are located near the user's ears and produce voice output. The input unit 15, which comprises switches, a touch panel and/or other means to be operated by the user, can be used by the user to input various instructions. For example, it can be used to input data for designating camera images to be displayed on the display 12, i.e., imaged time and place.

The controller 16 includes a microcomputer comprising a CPU, ROM, RAM and the like. The controller 16 controls the wireless unit 17 and communicates with the management server 30. For example, the controller 16 sends the management server 30 signals received from the sensors 11 and microphone 13. In addition, the controller 16 sends the display 12, speakers 14 and others control signals based on signals received from the management server 30.

In addition, the controller 16 responds to instructions input through the input unit 15 by reading image data stored in the management server 30 and displaying images by outputting control signals based on the read image data to the display 12. In other words, the controller 16 incorporates capability to playback camera images taken by the robots 20 in the past.

Figure 3:
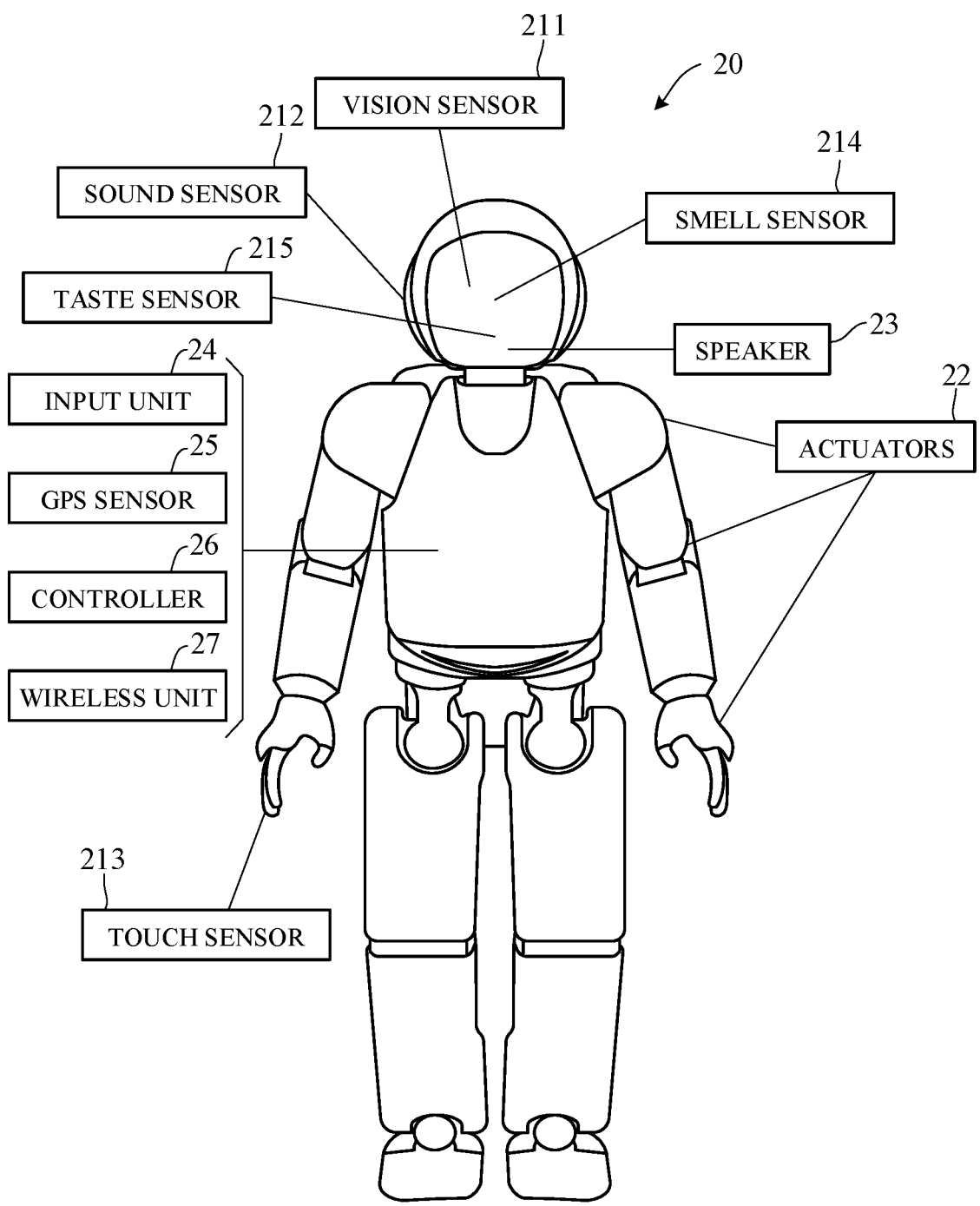
FIG. 3 is a diagram showing a configuration of the robot of FIG. 1.

FIG. 3 is a diagram showing structure of the robot 20. As shown in FIG. 3, the robot 20 is a humanoid robot having a head, trunk, two arms and two legs, and is capable of autonomous movement by biped walking. The robot 20 is nearly as tall as a human adult, with a height of around 140 to 160 cm, for example.

The robot 20 is equipped with multiple sensors possessing detection capabilities corresponding to the "five senses" traditionally recognized as sensing capabilities enabling humans to perceive the external world, namely, with a vision sensor 211, sound sensor 212, touch sensor 213, smell sensor 214, and taste sensor 215. The sensors 211 to 215 output signals corresponding to the human five senses (five sense signals) as detection signals.

The vision sensor 211 comprises a camera having an imaging unit comprising a CMOS sensor, CCD sensor or other image sensor located at an eye position of the robot 20 and a lens, a drive unit for driving the imaging unit vertically and laterally, and a zoom mechanism for enlarging and shrinking subject images. The vision sensors 211 take images (video images) around the robot 20. The sound sensor 212 comprises a microphone located, for example, at an ear position of the robot 20. The sound sensors 212 pick up sounds around the robot 20. The touch sensor 213 comprises a force sensor located, for example, at a hand position of the robot 20. The touch sensors 213 detect external force acting on the hands of the robot 20. The smell sensor 214 is located at a nose position of the robot 20 and detects smells. The taste sensor 215 is located at a mouth position of the robot 20 and detects tastes.

The robot 20 additionally comprises at least one each of an actuator 22, speaker 23, input unit 24, GPS sensor 25, controller 26, and wireless unit 27. The actuators 22 include multiple motors or the like provided, for example, at associated joints of the robot 20. Robot 20 actions are implemented by driving the actuators 22. The speaker 23 is located at the mouth position of the robot 20 and produces voice output. The input unit 24 is equipped with a power switch and various other switches. The GPS sensor 25 receives GPS signals from GPS satellites. Position of the robot 20 can be detected based on signals received from the GPS sensor 25.

The controller 26 includes a microcomputer comprising a CPU, ROM, RAM and the like. The controller 26 controls the wireless unit 27 and communicates with the management server 30. For example, the controller 26 sends the five sense signals output by the sensors 211 to 215 and the signals from the GPS sensor 25 to the management server 30. In addition, the controller 26 sends control signals to the actuators 22, speaker 23 and so on based on signals from the management server 30.

Figure 4:
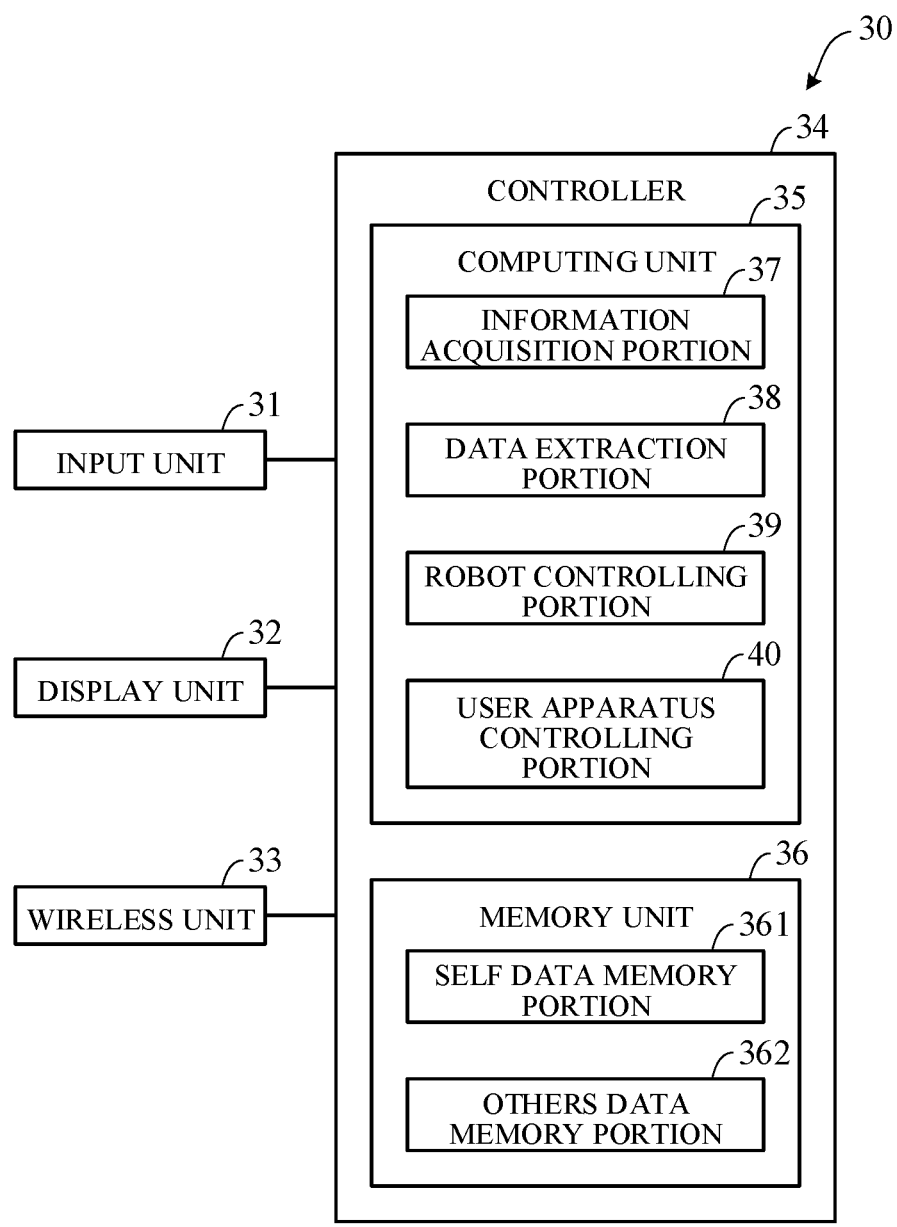
FIG. 4 is a block diagram showing configuration overview of a management server of FIG. 1.

FIG. 4 is a block diagram showing an example configuration overview of the management server 30. As shown in FIG. 4, the management server 30 comprises an input unit 31, display unit 32, wireless unit 33 and controller 34. Optionally, the input unit 31 and display unit 32 can be omitted. The wireless unit 33 can fulfill its purpose insofar as configured to communicably connect the user apparatus 10 and the robot 20 (as a communication connection unit).

The controller 34 comprises a CPU or other computing unit 35, a memory unit 36 equipped with ROM, RAM, hard disk and the like, and other peripheral circuits. The controller 34 controls the wireless unit 33 and communicates with the user apparatus 10 and the robot 20. The computing unit 35 comprises an information acquisition unit 37, a data extraction unit 38, a robot controlling portion 39 and a user apparatus controlling portion 40 as functional constituents. In addition, for convenience, multiple users and multiple robots will be separately described as shown in FIG. 1 as necessary.

The information acquisition unit 37 operates through the wireless unit 33 to acquire data transmitted from the user apparatus 10 (sensors 11, microphone 13, input unit 15 etc. of FIG. 2) and data transmitted from the first robot 20A (sensors 211 to 215, GPS sensor 25, etc. of FIG. 3). Of the data transmitted from the first robot 20A, image data acquired by the vision sensor 211 and voice data acquired by the sound sensor 212 are assigned the robot ID of the first robot 20A and the user ID of the user 1B participating in activities with the first robot 20A and stored in the memory unit 36.

As functional constituents, the memory unit 36 comprises a self data memory unit (also called as first-party data memory unit) 361 and an others data memory unit (also called as other-party data memory unit) 362. In the self data memory unit 361 are stored image data and voice data assigned the self user ID (user ID of user 1B). In the others data memory unit 362 are stored image data and voice data assigned the others user ID (user ID of user 1C). In the others data memory unit 362 can also be stored image data and voice data assigned user IDs of multiple users other than users 1A and 1C. The self data memory unit 361 also stores position data of the first robot 20A acquired by the GPS sensor 25 and time data corresponding to the position data. The others data memory unit 362 also stores position data of the second robot 20B acquired by its GPS sensor 25 and time data corresponding to the position data.

The data extraction unit 38 extracts image data and voice data corresponding to time (target time) and position (target position) input through the input unit 15 of the user apparatus 10 from among image data and voice data stored in the self data memory unit 361 in association with self user ID (user ID of user 1B). In other words, it extracts image data and voice data of target time and target position that user 1B wants to play back. Target time can be designated through the input unit 15 to include a certain time range such as from X month, X day, X time to Y month, Y day, Y time. Target position can be similarly designated through the input unit 15 not as an exact lot number address but simply as a place name covering a certain geographical area.

When no data matching the target time and target position input through the input unit 15 of the user apparatus 10 are stored in the self data memory unit 361, the data extraction unit 38 uses position data and time data of the first robot 20A stored in the self data memory unit 361 in association with assigned self user ID (user ID of user 1B) to specify actual position (position differing from target position) of first robot 20A at target time, whereafter it is decided whether target position input through the input unit 15 is within a predetermined distance from actual position of the first robot 20A. This is for deciding whether target position and actual position of the first robot 20A are in same region (same sightseeing area, for example), and the predetermined distance is defined, for example, as between several tens of meters and a few kilometers.

When target position input through the input unit 15 is decided to be within the predetermined distance from the actual position of the first robot 20A, the data extraction unit 38 extracts data corresponding to the time and position input through the input unit 15 from among image data and voice data stored in the others data memory unit 362 in association with assigned others user ID (user ID of user 1C) (image data and voice data acquired by the second robot 20B). On the other hand, when target position input through the input unit 15 is decided not to be within the predetermined distance from the actual position of the first robot 20A, the data extraction unit 38 outputs a data extraction impossible signal.

The robot controlling portion 39 generates actuation signals for the actuators 22 of the first robot 20A based on the first robot 20A action instructions received from the user apparatus 10, i.e., based on action instructions resulting from user 1A brain activity. These action signals are then sent through the wireless unit 33 to the first robot 20A. In response to these actuation signals, the controller 26 of the first robot 20A outputs control signals to the actuators 22. As a result, the first robot 20A can be made to act on behalf of the user 1A in accordance with intention of the user 1A. The robot controlling portion 39 can also use signals from the microphone 13 of the user apparatus 10 to reproduce the user's voice through the speaker 23 of the first robot 20A.

The user apparatus controlling portion 40 generates action signals for the user apparatus 10 based on signals (five sense signals) from the sensors 211 to 215 of the first robot 20A. These actions signals are then transmitted through the wireless unit 33 to the user apparatus 10. For example, picture signals based on signals detected by the vision sensors 211 are transmitted. In response to these picture signals, the controller 16 of the user apparatus 10 outputs control signals to the display 12 to display 3D pictures obtained from the vision sensors 211 on the display 12. The user 1A can therefore easily perceive circumstances around the robot 20 in real time. The user apparatus controlling portion 40 can also use signals from the sound sensors 212 to reproduce voices through the speakers 14 of the user apparatus 10.

In addition, the user apparatus controlling portion 40 transmits image data and voice data extracted by the data extraction unit 38 to the user apparatus 10 through the wireless unit 33.

Figure 5:
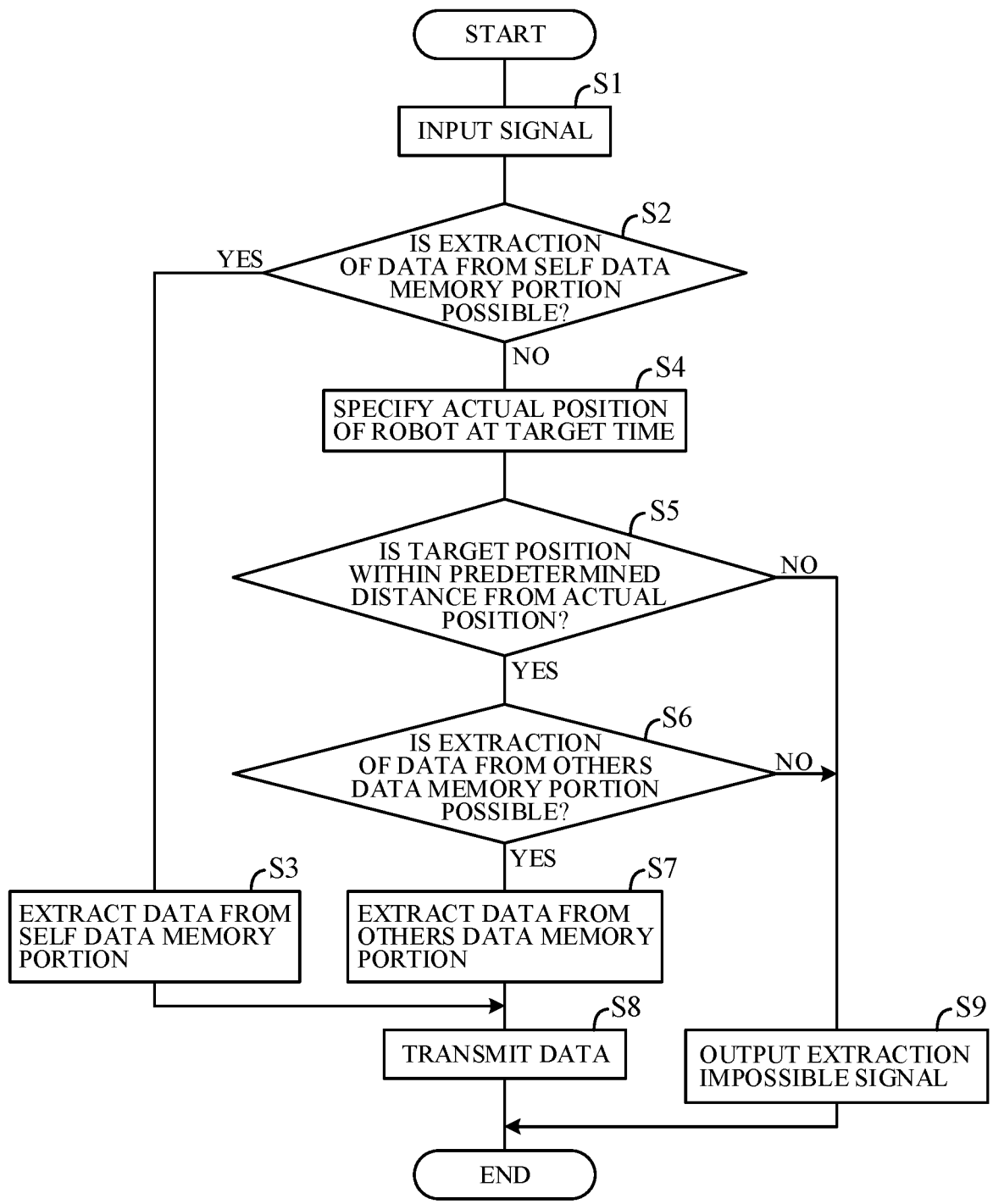
FIG. 5 is a flowchart showing an example of processing performed by a computing unit of FIG. 4.

FIG. 5 is a flowchart showing processing performed by the computing unit 35, particularly an example of processing related to image display by the user apparatus 10, in accordance with a program stored in the memory unit 36 in advance. The processing shown in this flowchart is started, for example, when user 1B, after coming at home, inputs an image playback instruction through the user apparatus 10 (input unit 15 thereof).

First, in S1 (S: processing Step), instructions input through the input unit 15, namely, instructions designating a target time and a target position of images desired to be played back, are read. Next, in S2, whether any image data and voice data corresponding to the designated target time and target position are stored in the self data memory unit 361 in association with self user ID is determined, namely, whether extraction of data from the self data memory unit 361 is possible is decided. When the result in S2 is YES, the program goes to S3, in which image data and voice data corresponding to the target time and the target position are extracted from the self data memory unit 361. Next, in S8, the extracted data is transmitted to the user apparatus 10.

On the other hand, when the result in S2 is NO, the program goes to S4, in which time data and position data stored in the self data memory unit 361 in association with the self user ID are used to specify an actual position of first robot 20A at the target time. Next, in S5, whether the target position is within a predetermined distance from the actual position of the first robot 20A is decided. When the result in S5 is YES, the program goes to S6, in which whether any image data and voice data corresponding to the designated target time and target position are stored in the others data memory unit 362 in association with the others user ID (user ID of user 1C) is determined, namely, whether extraction of data from the others data memory unit 362 is possible is decided. When the result in S6 is YES, the program goes to S7, in which image data and voice data corresponding to the target time and target position are extracted from the others data memory unit 362. Next, in S8, the extracted data is transmitted to the user apparatus 10.

When the result in S5 or in S6 is NO, the program goes to S9. In S9, a signal indicating that extraction from the memory unit 36 of data corresponding to the target time and the target position is impossible (extraction impossible signal) is sent to the user apparatus 10.

There now follows a concrete explanation of principal actions of the information providing system 100 according to the present embodiment. Assume, for example, a case where user 1B participates in activities with first robot 20A as illustrated in FIG. 1 and after returning home uses the user apparatus 10 to reproduce image data and voice data acquired by the first robot 20A. User 1B does this by using the input unit 15 to instruct the target time and the target position.

Figure 6:
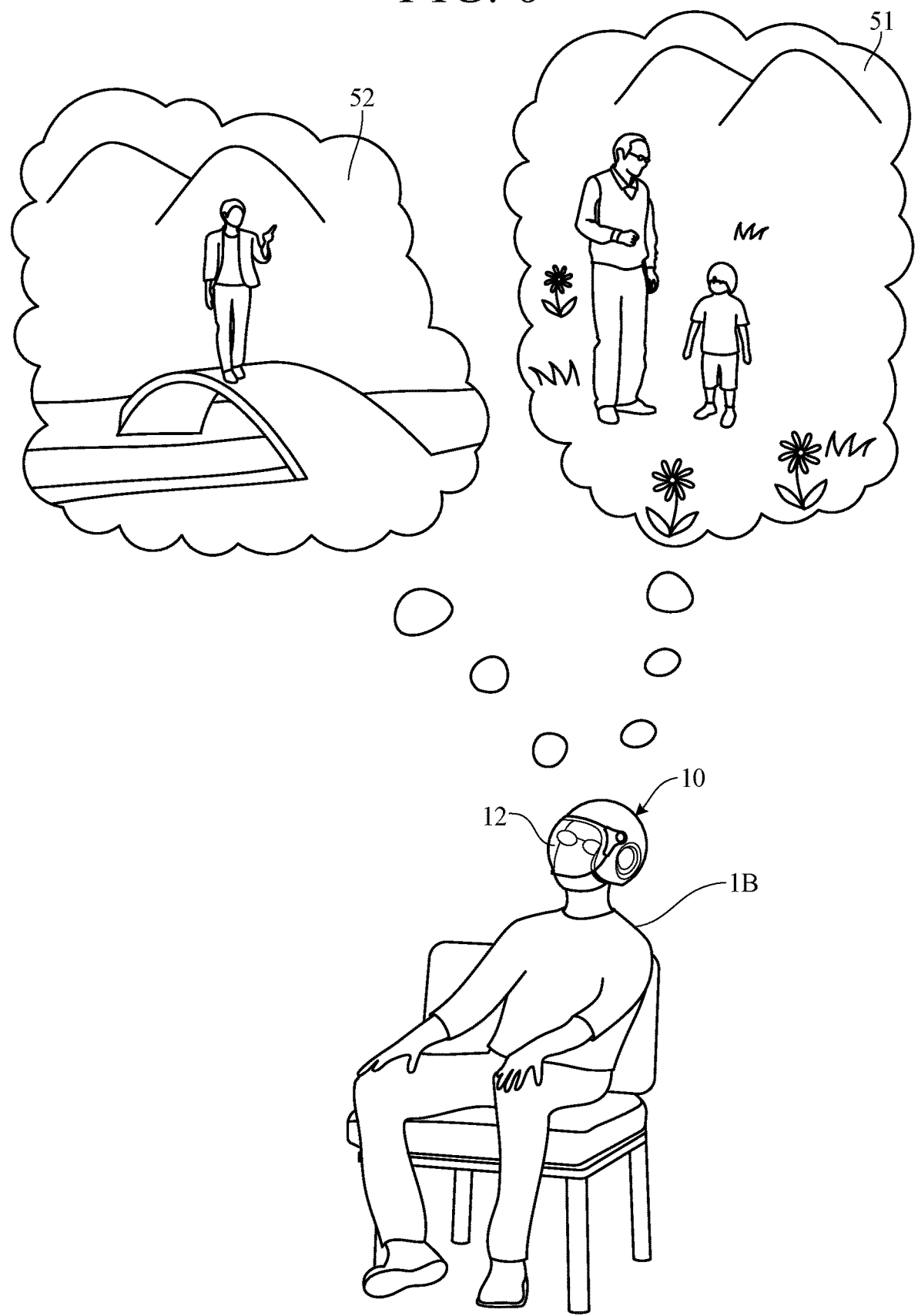
FIG. 6 is a diagram showing an example of action of an information providing system according to an embodiment of the present invention.

When, for example, user 1B designates point B (region) visited in the past and the time of that visit as the target position and the target time, the data extraction unit 38 extracts corresponding image data and voice data from the self data memory unit 361 (S3), and the user apparatus controlling portion 40 transmits the data to the user apparatus 10 (S8). As shown in FIG. 6, this results in past images 51 from point B being displayed on the display 12 of the user apparatus 10 worn by user 1B. So, user 1B is able to enjoy reminiscing about scenes from point B visited in the past.

When, for some reason (e.g., an incident of some kind), no data related to point B visited in the past are stored in the self data memory unit 361, the data extraction unit 38 extracts corresponding image data and voice data from the others data memory unit 362 (S7), and the user apparatus controlling portion 40 transmits the data to the user apparatus 10 (S8). So even in a case where the first robot 20A failed to acquire camera images, user 1B is nevertheless able to enjoy reminiscing about scenes from point B traveled to in the past.

On the other hand, when, for example, point C, which is near point B but could not be visited by user 1B during a past trip to point B, is designated as the target position, the data extraction unit 38 extracts corresponding image data and voice data from the others data memory unit 362 (S7), and the user apparatus controlling portion 40 transmits the data to the user apparatus 10 (S8). As shown in FIG. 6, this results in past images 52 of point C being displayed on the display 12 of the user apparatus 10 worn by user 1B. As point B actually visited by user 1B and point C that user 1B missed visiting are within a certain distance from each other in the same general area, point C image data serves as complementary data for user 1B to play back to enjoy point C images as an extension of earlier sightseeing at point B.

The present embodiment can achieve advantages and effects such as the following:

(1) The information providing system 100 according to the present embodiment includes: the robots 20 that are each equipped with the vision sensor 211 for acquiring image data and adapted to move with a user; the information acquisition unit 37 for acquiring position data of the robot 20 together with time data; the memory unit 36 for storing image data acquired by the vision sensors 211 in association with position data and time data acquired by the information acquisition unit 37; the data extraction unit 38 for extracting from image data stored in the memory unit 36, image data corresponding to a target time and a target position instructed by a user; and the display 12 for displaying images based on image data extracted by the data extraction unit 38 (FIGS. 1 to 4). The robots 20 include the first robot 20A that moves together with user 1B and the second robot 20B that moves together with user 1C (FIG. 1). The memory unit 36 has the self data memory unit 361 for storing image data acquired by the vision sensor 211 of the first robot 20A and the others data memory unit 362 for storing image data acquired by the vision sensor 211 of the second robot 20B (FIG. 4). The data extraction unit 38 is adapted to respond to no image data corresponding to the target time and the target position instructed by user 1B being present among image data acquired by the vision sensor 211 of the first robot 20A stored in the self data memory unit 361 by extracting from image data acquired by the vision sensor 211 of the second robot 20B stored in the others data memory unit 362, the image data corresponding to the target time and the target position instructed by user 1B (FIG. 5). Thus, when no image data corresponding to the target time and the target position is present in the self data memory unit 361, image data corresponding to the target time and the target position is extracted from image data stored in the others data memory unit 362, so that reproducible desired image data can be supplied to the user even in a case where the first robot 20A failed to acquire image data for some reason.

(2) When position data and time data of first robot 20A corresponding to the target time and the target position instructed by user 1B are not stored in the self data memory unit 361, i.e., when user 1B did not visit the target position at the target time, the data extraction unit 38 extracts image data corresponding to the target time and the target position from image data acquired by the vision sensor 211 of the second robot 20B stored in the others data memory unit 362 (FIG. 5). User 1B can therefore be provided with image data of a place where user 1B was unable to visit.

(3) On condition of a position of the first robot 20A stored in self data memory unit 361 as an actual position at the target time instructed by user 1B being within a predetermined distance from the target position instructed by user 1B, the data extraction unit 38 extracts from image data acquired by the vision sensor 211 of the second robot 20B and stored in the others data memory unit 362, image data corresponding to the target time and the target position instructed by user 1B (FIG. 5). Since image data of a place in the same region as a place user 1B visited together with first robot 20A is therefore extracted, the extracted image data can be supplied to user 1B as useful data utilizable as complementary data at the time of image playback.

(4) The robot 20 is configured to be able to walk (FIG. 3). As the robot 20 can therefore participate in activities with the user 1B without needing to be carried, it can easily acquire image data of user 1B's surroundings.

(5) The information providing method according to the present embodiment is adapted to provide information by means of the robots 20 that have the vision sensor 211 for acquiring image data and move with a user, and includes acquiring position data of the robot 20 together with time data, storing image data acquired by the vision sensor 211 in the memory unit 36 in association with acquired position data and time data, extracting from image data stored in the memory unit 36, image data corresponding to a time and place instructed by the user, and displaying images based on extracted image data (FIG. 5). The robots 20 include the first robot 20A that moves together with user 1B and the second robot 20B that moves together with user 1C (FIG. 1). Storing image data includes storing image data acquired by the vision sensor 211 of the first robot 20A and storing image data acquired by the vision sensor 211 of the second robot 20B. Extracting image data includes extracting image data corresponding to a target time and a target position from image data acquired by the vision sensor 211 of the second robot 20B stored in the memory unit 36, when image data corresponding to the target time and the target position instructed by user 1B is not present among image data acquired by the vision sensor 211 of the first robot 20A stored in the memory unit 36 (FIG. 7). Image data corresponding to the target time and the target position can therefore be provided to the user even in a case where the first robot 20A failed to acquire image data.

The aforesaid embodiment can be modified into various forms. Hereafter, modifications will be described. The aforesaid embodiments are adapted to use a humanoid robot which is capable of biped walking, but the robot is not limited to the above configuration insofar as the robot includes an imaging unit such as the vision sensor 211 acquiring image data and moves together with a user. The aforesaid embodiments are adapted to move the robot 20 based on instructions from the user 1A, but, for example, a robot can be configured so as to identify circumstances around itself to follow the user 1B. The aforesaid embodiments are adapted to configure the information providing system 100 so as that the information providing system 100 includes the first robot 20A and the second robot 20B, but information providing system 100 can be configured so as to including more robots. These robots may include not only robots being within a predetermine distance from a target position specified by a user but also robots being outside a predetermine distance.

The aforesaid embodiments are adapted to acquire position data and time data of the robot 20 by the information acquisition unit 37 acquiring a signal from the GPS sensor 25, but it can be adapted to acquire position data and time data of the user 1B instead of position data and time data of the robot 20 because the robot 20 and the user 1B act with each other. For example, the information acquisition unit 37 may acquire a signal from a mobile terminal carried by the user 1B which has a position data acquisition function such as GPA sensor. The aforesaid embodiments are adapted so that the data extraction unit 38 extracts position data and image data corresponding to a target time and a target position from the memory unit 36, but data can be of any type insofar as at least image data is extracted, and the data extraction unit 38 is not limited to the above configuration. The aforesaid embodiments are adapted to display images on the display 12 of the user apparatus 10 as a head-mounted display, but display 12 is not limited to the above configuration.

The management server 30 can be adapted to be in charge of a part of the function of the controllers 16, 26 of the user apparatus 10 and the robot 20 in the aforesaid embodiments. The controllers 16, 26 can be adapted to be in charge of a part of the function of the management server 30. The aforesaid embodiments are adapted so that the user apparatus 10 and the robot 20 communicate through the management server 30, but the user apparatus 10 and the robot 20 can communicate directly without the management server 30.

The aforesaid embodiments are adapted to rent the robot 20 form the shop 3, but for example, the present invention can be similarly configured even if a user uses a robot owned at home. The management server 30 and a terminal of the shop 3 may be configured to be able to communicate with each other, and a rental reservation application, a rental fee payment and others of the robot 20 may be performed through the management server 30.

The above description is only an example, and the present invention is not limited to the above embodiment and modifications, unless impairing features of the present invention. The above embodiment can be combined as desired with one or more of the above modifications. The modifications can also be combined with one another.

REFERENCE SIGNS LIST 10 user apparatus, 12 display, 16 controller, 20 robot, 20A first robot, 20B second robot, 26 controller, 30 management server, 36 memory unit, 37 information acquisition unit, 38 data extraction unit, 40 user apparatus controlling, 100 information providing system, 211 vision sensor

The invention claimed is:

1. An information providing system comprising:
   a first robot having a first imaging unit acquiring first image data and configured to move with a first user;
   a second robot having a second imaging unit acquiring second image data and configured to move with a second user;
   a server including a CPU and a memory connected to the CPU; and
   a user apparatus having a display, wherein
   the CPU is configured to perform:
      acquiring position data and time data of the first user or the first robot, and position data and time data of the second user or the second robot;
      storing, in the memory, the first image data acquired by the first imaging unit in association with the position data and the time data of the first user or the first robot;
      storing, in the memory, the second image data acquired by the second imaging unit in association with the position data and the time data of the second user or the second robot;
      receiving a target time and a target position from the user apparatus for which to playback the first image data;
      determining whether the first image data corresponding to the target time and the target position is present among the first image data stored in the memory;
      in response to determining that the first image data corresponding to the target time and the target position is present among the first image data stored in the memory:
         extracting, from the memory, the first image data corresponding to the target time and the target position; and
         transmitting the first image data to the user apparatus for displaying on the display;
      in response to determining that the first image data corresponding to the target time and the target position is not present among the first image data stored in the memory:
         extracting, from the memory, the second image data corresponding to the target time and the target position; and
         transmitting the second image data to the user apparatus for displaying on the display.

2. An information providing system according to claim 1, wherein the CPU is configured to perform:
   extracting, from the memory, the second image data corresponding to the target time and the target position when the position data and the time data of the first robot or the first user corresponding to the target time and the target position are not stored in the memory.

3. An information providing system according to claim 1, wherein the CPU is configured to perform:
   extracting, from the memory, the second image data corresponding to the target time and the target position on condition of a position of the first user or the first robot being within a predetermined distance from the target position.

4. An information providing system according to claim 1, wherein:
   the first robot is configured to be able to walk.

5. An information providing method comprising:
   acquiring first image data with a first imaging unit on a first robot configured to move with a first user;
   acquiring second image data with a second imaging unit on a second robot configured to move with a second user;
   acquiring position data and time data of the first user or the first robot, and position data and time data of the second user or the second robot;
   storing, in memory, the first image data acquired by the first imaging unit in association with the position data and the time data of the first user or the first robot;
   storing, in the memory, the second image data acquired by the second imaging unit in association with the position data and the time data of the second user or the second robot;
   receiving a target time and a target position from a user apparatus for which to playback the first image data;
   determining whether the first image data corresponding to the target time and the target position is present among the first image data stored in the memory;
   in response to determining that the first image data corresponding to the target time and the target position is present among the first image data stored in the memory:
      extracting, from the memory, the first image data corresponding to the target time and the target position; and
      transmitting the first image data to the user apparatus for displaying on a display;
   in response to determining that the first image data corresponding to the target time and the target position is not present among the first image data stored in the memory:
      extracting, from the memory, the second image data corresponding to the target time and the target position; and
      transmitting the second image data to the user apparatus for displaying on the display.

6. An information providing method according to claim 5, wherein extracting the second image data comprises:
   extracting, from the memory, the second image data corresponding to the target time and the target position when the position data and the time data of the first robot or the first user corresponding to the target time and the target position are not stored in the memory.

7. An information providing method according to claim 5, wherein extracting the second image data comprises:
   extracting, from the memory, the second image data corresponding to the target time and the target position on condition of a position of the first user or the first robot being within a predetermined distance from the target position.

8. An information providing method according to claim 5, wherein:
   the first robot is configured to be able to walk.

* * * * *